United States Patent [19]

Povleski

[11] Patent Number: 4,972,589
[45] Date of Patent: Nov. 27, 1990

[54] CUTTING AND SANDING ATTACHMENTS FOR A HAND DRILL

[76] Inventor: Robert W. Povleski, c/o Security Contracting Co., Inc., 3710 Elkader Rd., Baltimore, Md. 21218

[21] Appl. No.: 401,622

[22] Filed: Aug. 31, 1989

[51] Int. Cl.$^5$ .................. B23B 51/00; B23B 21/00
[52] U.S. Cl. ................................. 30/500; 30/122; 30/388
[58] Field of Search ............... 30/296.1, 383, 388, 30/390, 166.3, 122, 500

[56] References Cited

U.S. PATENT DOCUMENTS

| | | |
|---|---|---|
| 1,620,374 | 3/1927 | Maloney . |
| 1,622,120 | 3/1927 | Lynn . |
| 2,986,178 | 5/1961 | Cranmore . |
| 2,993,518 | 7/1961 | Bork . |
| 3,028,890 | 4/1962 | Atkinson et al. . |
| 3,260,290 | 7/1966 | Happe et al. . |
| 3,360,021 | 12/1967 | Mejia . |
| 3,404,456 | 10/1968 | Chilko . |
| 3,505,733 | 4/1970 | Holden . |
| 3,506,044 | 4/1970 | Evans . |
| 3,707,768 | 1/1973 | Spengler . |
| 3,715,805 | 2/1973 | Fraser . |
| 3,835,901 | 9/1974 | Jonsson . |
| 3,901,117 | 8/1975 | Hoffman . |
| 4,048,720 | 9/1977 | Wheeler . |
| 4,122,601 | 10/1978 | Katsuya . |
| 4,280,276 | 7/1981 | Comer et al. . |
| 4,411,068 | 10/1983 | Theodorides . |
| 4,552,192 | 11/1985 | Eaves . |
| 4,574,481 | 3/1986 | Ericsson . |
| 4,651,420 | 3/1987 | Lonnecker . |
| 4,654,971 | 4/1987 | Fettes et al. ............. 30/383 |

*Primary Examiner*—Douglas D. Watts
*Attorney, Agent, or Firm*—Cushman, Darby & Cushman

[57] ABSTRACT

Attachments for a power source such as a rotary drill. Such attachments can be fixedly secured to the power source. Turning power on to the source drives a shaft which drives a gear mechanism which drives a utility woodworking head such as a circular saw or power sander. The power source may be turned on indirectly by a false trigger mechanism slidably attached to a housing so enclosing the drive shaft and assisting to support the apparatus.

16 Claims, 3 Drawing Sheets

CUTTING AND SANDING ATTACHMENTS FOR A HAND DRILL

BACKGROUND OF THE INVENTION

1. Field of the Invention

This invention relates to power tool attachments capable of attaching to a rotary power source such as a hand drill. More particularly, this invention relates to a circular saw and a drum sander attachment driven by a gear mechanism housed within a tubular support member.

2. Description of the Prior Art

In today's society, there is a continuous demand for carpenters, contractors, etc. With the demand for skilled woodworkers comes a demand for instruments which allow precision cutting and sanding. It is difficult to both quickly and accurately do precision cutting and sanding.

To sand in tight spaces has generally required hand sanding which takes tremendous time and effort. Precision cutting would usually require the use of a hand held jigsaw to do cutting such as that required for cutting out electrical outlet boxes or medicine cabinet openings which recess into walls.

U.S. Pat. No. 3,506,044 discloses a portable power tool driven by a gear assembly. While this invention does include a gear assembly, it lacks the adaptability of the present invention. The present invention can be fixed to any hand drill or other such power source and does not require its own internal motor. Because of the lack of a motor, the present invention is more affordable to the consumer seeing that only attachments need to be bought.

U.S. Pat. No. 4,574,481 teaches using gears for driving a shaft but does not teach the attachments according to the present invention. The patent to Ericsson is for a portable motor, not for attachments. Undoubtedly a motor such as disclosed by Ericsson could be adapted for use with the present invention, but using the motor of Ericsson takes away the maneuverability of the present invention. A hand held power source such as an electric drill is much more advantageous.

U.S. Pat. No. 3,505,733 to Holden discloses a power operated hand tool which looks remotely like the cutting attachment of the present invention but is driven by transverse oscillation of a drive means.

Moreover, none of these patents teach an easy way of controlling whether the device is on or off, which is an essential feature for precise, close-in work. These patents do not use the simple structure of this invention.

A type of circular saw that is run by a drill is known in the art. This device looks like a small version of a power circular saw. However, instead of having a motor built into the saw, this device has a space where an external driving means can be attached to the saw. This saw is cumbersome to use as it requires one hand to guide the saw and one hand to operate the power supply. The circular saw is unable to do as fine a job as the present invention as the circular saw is not capable of getting up close to walls or doing precision woodworking. The present invention is better as it is easier to guide and can perform more precise cutting.

SUMMARY OF THE INVENTION

The present invention provides apparatus which is attachable to a power source such as a portable hand drill. Such apparatus can be connected to the power source in the same manner in which a drill bit is firmly fastened into a drill.

Preferably, the apparatus provides either a cutting or sanding attachment, but other attachments are certainly possible. The apparatus also includes a trigger extension which allows the off/on trigger of a drill to be pressed indirectly from a more convenient location. Such a trigger extension allows the user to position his hands closer to the cutting or sanding attachment. This allows better control of the device. The present invention makes it easy to operate the device with one hand while the material being worked on is held by the free hand. It is also advantageous to have a hand guard that will keep hands and fingers from wandering in to the path of the saw blade or sanding head, thus preventing injury.

An object of the present invention is to provide these attachments capable of fastening to a power source such as an electric drill. Another object is to provide apparatus which can do precision cutting and sanding.

Other objects and characteristics of the present invention will become apparent upon consideration of the following description and drawings. The methods of operation and the functions of the related elements will also become clear.

BRIEF DESCRIPTION OF THE DRAWING

These and other advantages can be better appreciated by studying the following detailed description of the presently preferred exemplary embodiment together with the drawings in which:

FIG. 1A is a side perspective view of the circular saw blade with a three piece blade guide attached;

DETAILED DESCRIPTION OF THE PRESENTLY PREFERRED EXEMPLARY EMBODIMENTS

Figure 1:
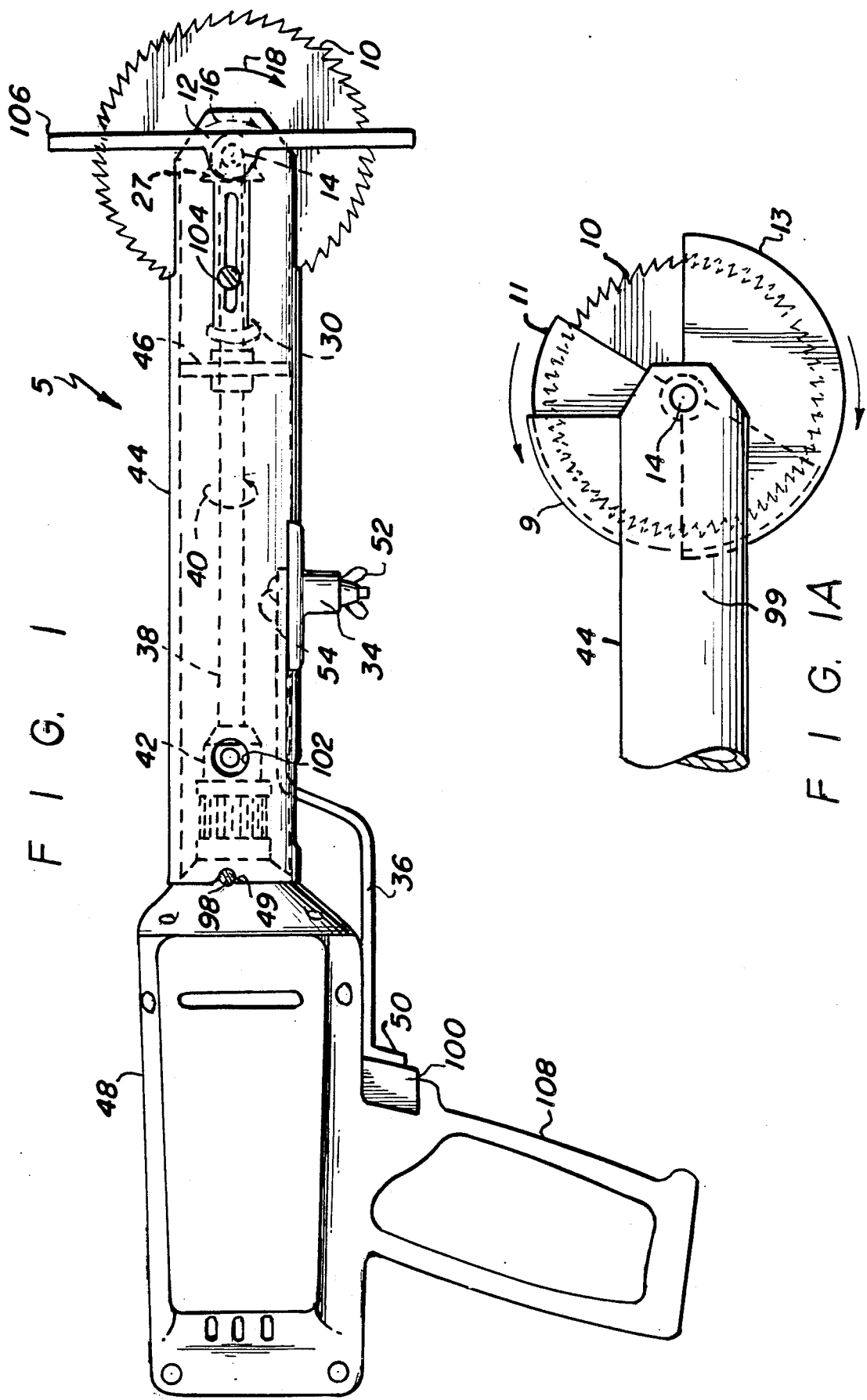
FIG. 1 is a side perspective view of the first embodiment of the invention.
Figure 2:
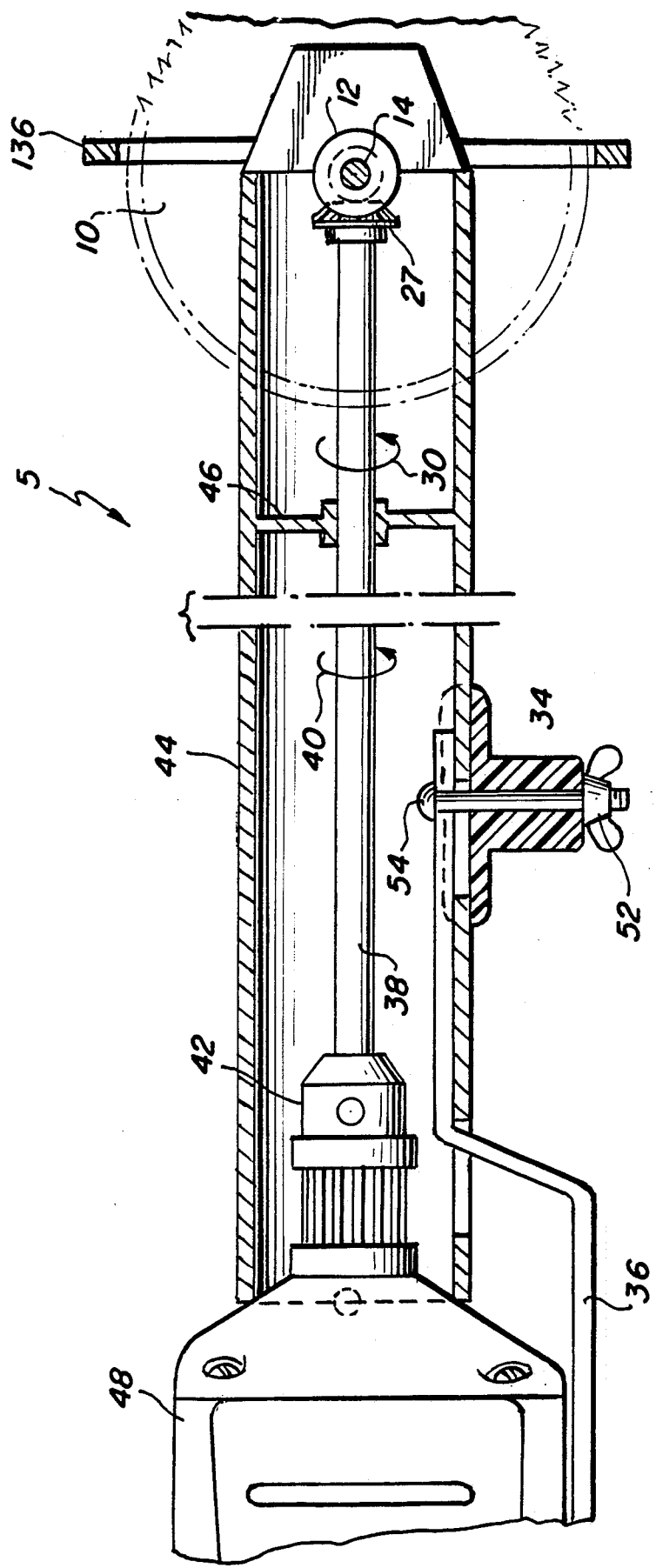
FIG. 2 is a cross sectional view of the embodiment shown in FIG. 1.

As shown in FIGS. 1 and 2, the present invention is shown with a utility woodworking head attached, more particularly a circular saw attachment generally shown at 5 attached to a hand drill 48. A circular saw blade 10 is driven by a gear assembly comprising gears 27 and 12. Gear 12 is attached via holding pin 14 to blade 10. Gear 12 is driven by shaft gear 27.

When shaft 38 turns in the direction of arrow 40, shaft gear 27 turns in the direction of arrow 30. Shaft gear 27 turns gear 12 in the direction of arrow 16. Holding pin 14 secures gear 12 to blade 10, thus blade 10 turns in the direction indicated by arrow 18, the same direction as gear 12 turns. If the direction that shaft 38 rotates is reversed, so too is the direction of gears 12 and 27 and of the blade 10. Note that in this embodiment of the invention, shaft gear 27 and gear 12 are located on the far side of blade 10.

Shaft 38 is secured in drill chuck 42 in the same manner as a drill bit would be secured. Drill chuck 42 is driven by turning power on to drill 48. Power is turned on by depressing drill trigger 100.

The gear and shaft assembly described above is housed inside tubular housing member 44. Also built on housing 44 is a false trigger 34. The false trigger 34 is fastened to trigger extension 36 by screw 54 and wing nut 52. Trigger extension 36 terminates at trigger push 50 which in operation pushes the trigger of drill 48. The false trigger 34 and trigger extension 36 allow the apparatus to be grasped on housing 44 rather than at the drill handle so it is possible to have better control over the blade 10. The device can be maneuvered more accurately and the power controlled by activating the drill trigger with false trigger 34.

Plate 46 is provided within said housing 44 to prevent dust and debris from being thrown by blade 10 toward drill 48. Shaft 38 passes through a circular aperture in plate 46. Most of the gear mechanism is enclosed by housing 44.

As shown in FIG. 1A, blade 10 can be covered with a two piece rotatable blade guard, the two pieces being numbered 11 and 13, and a stationary piece 9. The stationary piece 9 is mounted on housing 44. Pieces 11 an 13 are rotatable so as to rotate and cover the blade and can be rotated so as to be below piece 9 and therefore allow cutting to be done. FIG. 1A shows blade 10 being completely encompassed by rotatable guard 11/13 and stationary piece 9, preventing a user holding the device at area 99 from being cut. When the operator is ready to use the saw attachment, pieces 11 and 13 can be moved in the direction of the arrows until both guard pieces 11 and 13 are together and are substantially covered by piece 9. This enables the maximum amount of the saw blade to be exposed. Guard pieces 11, 13 have their center of rotation at bolt 14 which secures the guard pieces to the attachment.

FIG. 1 shows how trigger extension 36 fits over drill trigger 100 with trigger push 50 abutting drill trigger 100. The false trigger 34 is located nearer the blade than the power source, thus allowing more precise control over the blade 10.

A first embodiment of the invention provides an access hole 102 in housing 44 to loosen or tighten the drill chuck 42. According to a second embodiment, shaft 38 is hexagonal and no chuck tightening is therefore required.

A indentation 49 in the otherwise flat end of housing 44 is provided for safety reasons. A screw 98 is inserted into the drill 48 through the indentation 49, and screw 98 has a head which is smaller than the largest width of indentation 49. This screw 98/indentation 49 enables the device to move slightly but prevents violent twisting should the blade become jammed. Without the provision of such means, housing 44 could be caused to twist and the sharp edges of the blade could easily hurt the user or nearby people.

A saw guide 106 is attached to housing 44 by a securing bolt 104. Saw guide 106 prevents the blade 10 from penetrating too deep into wood and helps maintain a smooth cut. Guide 106 pivots around bolt 104 so that sawing may be done effectively below the blade, above the blade, or in front of the blade.

It is preferable to mount a hand guard (not shown) to housing 44 to prevent injuries. Such a guard will stop fingers from getting too close to blade 10. Such a guard can also stop dust and debris from shooting towards the operator.

Housing 44 is constructed of a material which is capable of withstanding some impact. Materials such as steel or other strong metals or high impact plastic are examples of suitable housing materials.

Figure 3:
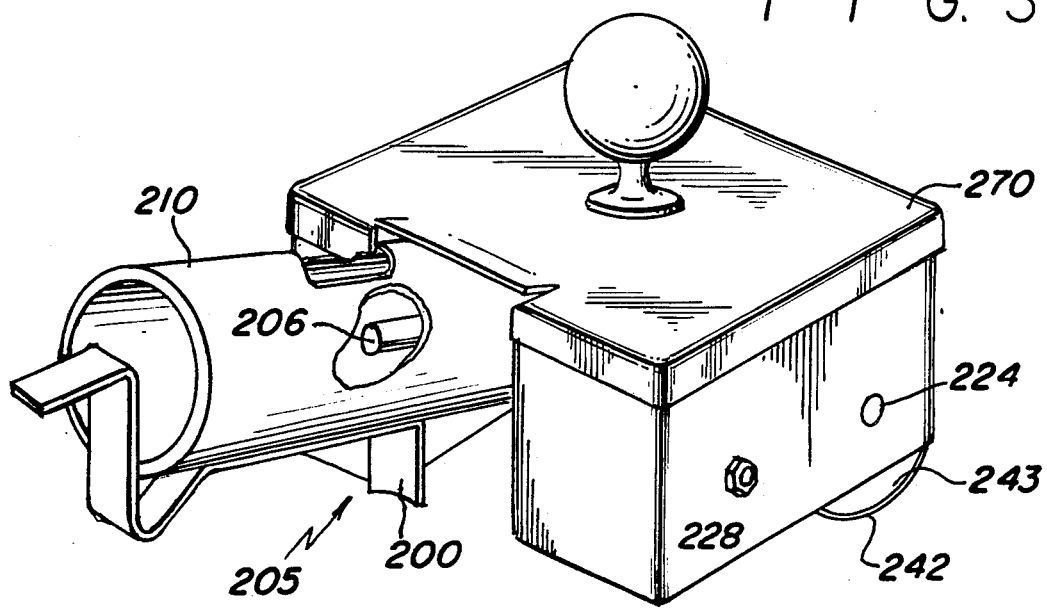
FIG. 3 is a perspective view of a second embodiment shown with the tubular housing partially cut-away.
Figure 3A:
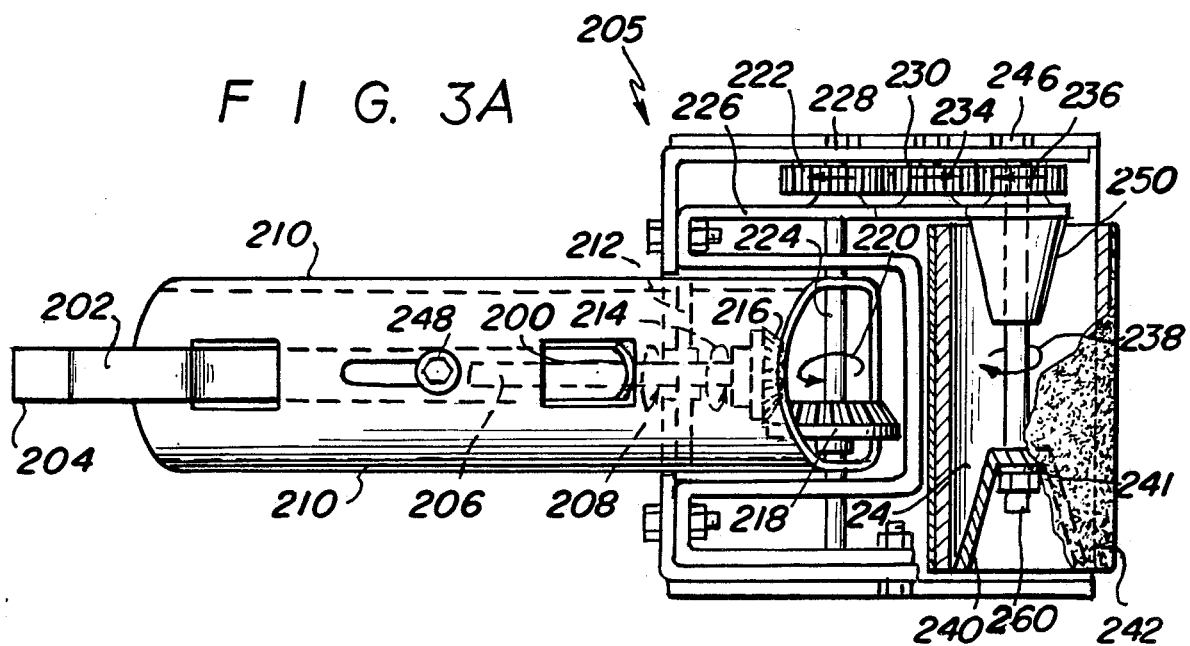
FIG. 3A is a bottom plan view of the second embodiment of the invention.

FIGS. 3 and 3A depict a second embodiment of the invention in which a sanding attachment generally shown at 205 is shown with housing 210 cut away. Like the cutting attachment, the sanding attachment is secured to drill 48. Shaft 206 is held by drill chuck 42 as would be a drill bit. By applying power by squeezing the drill trigger 100 in FIG. 1, the shaft is caused to rotate in the direction of arrow 208. Shaft 206 causes gear 216 to rotate in the same direction as the shaft, namely in the direction of arrow 214. Gear 216 meshes with gear 218. Gear 218 moves in the direction indicated by arrow 220, thus turning gear shaft 224. Gear shaft 224 extends through housing 210 and outside gear support 226, terminating in gear 222. Bolt 228 secures gear shaft 224 to gear 222. When driven, gear 222 rotates in the same direction as gear 218 as indicated by arrow 244.

Gear 222 meshes with gear 230 and drives it in the direction of arrow 234. Gear 230 meshes with gear 236 which is secured to drum 240 by bolt 246. Arrow 238 indicates the direction of motion of gear 236 and of drum 240. For sanding, sandpaper 242 is fixed to drum 240.

FIG. 3A shows bolt 246 extending through drum 240. Bolt 246 passes through protrusion 250 which offers support to the bolt. Securing nut 260 holds drum 240 tightly on bolt 246. Drum 240 has a hard rubber outer surface 243 to which sandpaper 242 is fixed. Support wings 241 extend inwardly from rubber outer surface 243. Support wings 241 have a hole through their center through which bolt 246 passes so as to rigidly secure drum 240 to the attachment. It is possible to remove drum 240 from the attachment for cleaning, to replace the sandpaper, or other purposes.

The second embodiment has a trigger mechanism like that of the first embodiment as is shown in FIG. 3 and 3A. False trigger 200 is secured to housing 210 by trigger pin 248 which is slidably attached to housing 210. When false trigger 200 is pressed toward drill 48, trigger extension 202 is moved accordingly, thereby causing trigger push 204 to depress trigger 100. Using the false trigger mechanism allows the drill 48 and attachment generally shown at 205 to be grasped on the housing 210 rather than at drill handle 108. This allows better control and gives the user the abilitY to sand in areas that would be inaccessible otherwise.

Plate 212 is provided within housing 210, thus serving to support shaft 206. It is also preferable to cover the sanding drum 240 with a guard 270 to prevent dust or particles from flying toward the operator. A guard would preferably be made of a hard plastic or some sort of metal to be able to withstand bouncing and impact. It is also desirable to have a indentation in the housing of this embodiment similar to that of the first embodiment.

The sanding unit could also be interchanged with the saw blade without switching housings. The same two gears 27, 12 that drive the saw could be used to drive the drum sander by replacing the saw guide with appropriate driving gears for the drum sander.

The attachments of FIGS. 1-3 are attached to a power source such as the hand drill depicted in operation. Using the false trigger mechanisms shown allows the invention to be grasped on the housing and allows more precise cutting and sanding.

While the invention has been described in connection with what is presently considered to be the most practical and preferred embodiments, it is to be understood that the invention is not limited to the disclosed embodiments but is intended to cover various modifications and equivalent arrangements included within the scope of the claims.

For example, the attachment could conceivably be one other than a circular saw or a sander. The attachment could be mounted on a power source other than a hand-held drill, although a hand held drill seems to be among the top choices at this time. The outside gears of the sander embodiment could be housed within some sort of casing to prevent grit from clogging the gears. While the embodiment has been described as using gears, belts or any other suitable drive mechanism could also be used. Therefore, persons of ordinary skill in the art are to appreciate that all equivalent structures are to be included within the scope of the following claims.

What is claimed is:

1. An attachment for a rotary power source which has an integral on/off control, said attachment comprising:
    a gear mechanism;
    a utility head for performing precision woodworking tasks, said head coupled to and driven to rotate by said gear mechanism;
    a rotatable shaft attachable to said power source, said shaft rotating to drive said gear mechanism when said power source is on;
    a housing enclosing at least said shaft, said housing including means for supporting said attachment and including an outer surface adapted to be grasped by an user; and
    a false trigger mechanism for controlling an operation of said power source, said false trigger mechanism being slidably mounted on said housing and having means for contacting said integral on/off control of said rotary power source to control said power source so as to allow said user to easily control on and off operation of said attachment while grasping said outer surface of said housing, said false trigger mechanism being located closer to said utility head than to said power source, said false trigger mechanism including a false trigger, a trigger extension extending toward said power source, said extension being fixedly connected with said false trigger, and a trigger push for physically contacting said integral on/off switch of said power source, said trigger push fixedly connected to said trigger extension so that when said false trigger slides, said trigger push slides accordingly.

2. Apparatus as in claim 1 wherein said utility head comprises a rotary saw blade.

3. Apparatus as in claim 1 wherein said utility head comprises a drum sander.

4. Apparatus as in claim 1 wherein said gear mechanism comprises:
    a shaft gear securely mounted on an end of said shaft; and
    other gears driven by said shaft gear, said other gears driving said utility head.

5. Apparatus as in claim 1 wherein said housing is made of a material from the group consisting of high impact plastics and metals.

6. Apparatus as in claim 2 wherein said attachment further includes a saw guide which keeps an incision made by said blade at a even depth.

7. Apparatus as in claim 2 further comprising a three piece blade guard which includes:
    a stationary piece mounted to said housing and covering about 25% of the blade and being curved with a first radius;
    a first rounded piece for covering a part of the blade and having a second radius less than said first radius; and
    a second rounded piece for covering another part of the blade and having a third radius being less than said second radius and designed so that said second rounded piece can be rotated under said first piece and both can be rotated under said stationary piece so that the blade can be uncovered.

8. Apparatus as in claim 3 wherein said drum sander includes a head on which sandpaper can be fastened having interior supports for securely mounting said head to said drum sander attachment.

9. A method of using a woodworking attachment for a power drill comprising the steps of:
    attaching a drive shaft, enclosed by a supportive housing, to a drill chuck of a power hand drill;
    initiating operation of said power drill by pressing a false trigger mechanism slidably mounted on said housing, thereby pressing a trigger of said power drill and allowing power of the drill to turn said drive shaft;
    driving a gear mechanism engaged with said shaft; and
    driving a utility woodworking head by the turning of said gear mechanism, said woodworking head located nearer said false trigger than said power source.

10. A method as in claim 9 wherein said utility woodworking head is a circular saw blade.

11. A method as in claim 9 wherein said utility woodworking head is a power sander.

12. The method of claim 9 further comprising the step of tightening said drill chuck to hold said drive shaft.

13. An attachment for a rotary power source, said attachment comprising:
    a rotatable drive shaft, including means for attaching to said power source at one end of said drive shaft;
    a gear mechanism located at one end of said drive shaft and driven to rotate by a rotation of said drive shaft;
    a housing enclosing said drive shaft and a portion of said gear mechanism and including means for supporting said shaft to rotate in a substantially central portion of said housing, said housing including:
    (a) a first end housing said one end of said drive shaft;
    (b) an inner surface;
    (c) means for maintaining said power source, when attached, as spaced from said inner surface, said maintaining means coupled to said inner surface;
    (d) an outer surface, coupled to said inner surface, forming a surface by which said attachment can be grasped during operation;
    (e) a second end; and
    (f) a utility head driven by said gear mechanism, said utility head being adapted to perform woodworking functions.

14. An attachment as in claim 13 wherein said housing is cylindrical.

15. An attachment as in claim 13 wherein said means for attaching is a surface of said drive shaft, and said housing is formed with a hole therein through which tightening between said rotary power source and said means for attaching can be accomplished.

16. An attachment as in claim 13 wherein said means for attaching is a hexagonal outer perimeter of said drive shaft.

* * * * *